United States Patent
Xu et al.

(10) Patent No.: US 10,207,600 B2
(45) Date of Patent: Feb. 19, 2019

(54) INFLATABLE AIR CUSHION SYSTEM AND SEAT ASSEMBLIES INCLUDING THE SAME

(71) Applicant: Ford Global Technologies, LLC, Dearborn, MI (US)

(72) Inventors: Wei Xu, Nanjing (CN); Kevin Shen, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 15/433,148

(22) Filed: Feb. 15, 2017

(65) Prior Publication Data

US 2017/0240076 A1 Aug. 24, 2017

(30) Foreign Application Priority Data

Feb. 22, 2016 (CN) .......................... 2016 1 0096479

(51) Int. Cl.
| | | |
|---|---|---|
| *B60N 2/24* | (2006.01) | |
| *B60N 2/02* | (2006.01) | |
| *B60N 2/00* | (2006.01) | |
| *B60N 2/90* | (2018.01) | |

(52) U.S. Cl.
CPC ........... *B60N 2/0244* (2013.01); *B60N 2/002* (2013.01); *B60N 2/914* (2018.02); *B60N 2/99* (2018.02); *B60N 2002/0268* (2013.01)

(58) Field of Classification Search
CPC .................................. B60N 2/99; B60N 2/914
See application file for complete search history.

(56) References Cited

U.S. PATENT DOCUMENTS

| | | | | |
|---|---|---|---|---|
| 5,082,326 A | * | 1/1992 | Sekido ................... | B60N 2/914 297/284.6 |
| 6,088,643 A | * | 7/2000 | Long ........................ | A47C 4/54 701/49 |
| 6,616,229 B2 | * | 9/2003 | Kuster ................... | B60N 2/449 297/284.9 |
| 8,056,970 B1 | | 11/2011 | Phillips | |
| 8,282,161 B1 | | 10/2012 | Jacobson | |
| 2007/0246285 A1 | * | 10/2007 | Browne ................. | B60R 7/043 180/273 |
| 2009/0134688 A1 | | 5/2009 | Walman et al. | |
| 2009/0218858 A1 | * | 9/2009 | Lawall ................. | B60N 2/4235 297/216.1 |

(Continued)

FOREIGN PATENT DOCUMENTS

DE 102006037521 A1 * 5/2007 ........... B60N 2/0284

OTHER PUBLICATIONS

Doefler et al., System for automatic adjustment of seats, 2007, EPO, DE 10 2006 037 521 A1, Machine Translation of Description (Year: 2007).*

*Primary Examiner* — James A English
(74) *Attorney, Agent, or Firm* — Alice Xu; Mohr IP Law Solutions, PC

(57) ABSTRACT

The present disclosure provides an inflatable air cushion system of a vehicle seat. The inflatable air cushion system includes an inflatable air cushion positioned within a side supporting portion of the seat and configured to expand away from a middle supporting portion of a cushion substantially in a widthwise direction, an inflator connecting to the inflatable air cushion, and a controller for controlling the inflator to inflate the inflatable air cushion in response to a passenger occupancy signal.

18 Claims, 8 Drawing Sheets

(56) References Cited

U.S. PATENT DOCUMENTS

2013/0084790 A1* 4/2013 Furuse ................. B60H 1/3204
                                                    454/75
2013/0321590 A1* 12/2013 Kirk ....................... G06T 15/04
                                                    348/48
2013/0334845 A1   12/2013 Fung
2015/0151660 A1   6/2015  Goldman

* cited by examiner

INFLATABLE AIR CUSHION SYSTEM AND SEAT ASSEMBLIES INCLUDING THE SAME

RELATED APPLICATION

This application claims the benefit of Chinese Patent Application No.: CN 201610096479.2 filed on Feb. 22, 2016, the entire contents thereof being incorporated herein by reference.

FIELD

The present application relates to an inflatable air cushion system and a seat assembly including the same.

BACKGROUND

A vehicle's front seat often needs to be moved back and forth to accommodate different drivers or passengers, thus it is necessary to leave a gap between a side of the seat and a console unit for facilitating the movement. The driver or passenger may inadvertently drop small articles such as cellphones, cards or coins down to bottom of the seat via the gap. The article may be hard to find or reach due to the small gap size.

To address this issue, various devices such as baffles and air pockets are utilized between the vehicle seat and the console unit to avoid articles falling off.

The inventors have herein recognized some issues related to the above solutions. For instance, a baffle may be mounted between the vehicle seat and the console unit, and needs to be designed with different sizes for accommodating different layouts; thus, the baffle is not universal. In addition, it is needed to remove the baffle before adjusting the seat in order to avoid interference of the baffle during seat movement. Also, there is an issue with an air pocket positioned between the vehicle seat and the console. For example, it is first needed to charge the air pocket, then place it between the seat and console, and next adjust the charged volume to avoid interference during the movement of the seat. The air pocket is not time-efficient in use and has an unappealing appearance. In addition, the baffle or air pocket is required to be fixed on the seatbelt buckle, which may cause interference.

SUMMARY

According to one aspect of the present disclosure, an inflatable air cushion system of a vehicle seat is provided. The inflatable air cushion system includes an inflatable air cushion positioned within a side supporting portion of the seat with a length and a width configured to be fitted into the side supporting portion of the seat and expand away from a middle supporting portion of a cushion substantially in a widthwise direction, a inflator connecting to the inflatable air cushion, and a controller for controlling the inflator to inflate the inflatable air cushion in response to a passenger occupancy signal.

In one embodiment, the inflatable air cushion further comprises a weight sensor to detect if there is a passenger on the seat.

In another embodiment, the inflatable air cushion includes a first portion formed of non-inflatable material and a second portion formed of inflatable material, and the first portion is positioned adjacent to middle supporting portion of the cushion.

In one embodiment, the inflatable air cushion further comprises a guiding member at least partially accommodating the inflatable air cushion in the widthwise direction of the inflatable air cushion and extending along a lengthwise direction of the inflatable air cushion, and the guiding member may impede an expansion toward the guiding member in the widthwise direction.

According to another aspect of the present disclosure, a seat assembly of a vehicle is provided. The seat assembly includes a cushion including a middle supporting portion and two side supporting portions respectively positioned at opposing sides of the middle supporting portion; an inflatable air cushion positioned in at least one of the side supporting portions along the side of the cushion; an inflator connecting to the inflatable air cushion; and a controller configured to control the inflator to inflate the inflatable air cushion when determined that there is a passenger on the cushion such that the inflatable air cushion expands away from the middle supporting portion of the cushion substantially in a widthwise direction.

In one embodiment, the seat assembly further comprises a weight sensor positioned in the middle supporting portion so as to determine if there is a passenger on the cushion.

In another embodiment, the controller is connected with a seatbelt sensor to obtain information to determine if there is a passenger on the cushion.

In another embodiment, the inflatable air cushion is inflated after a predetermined time period when the controller determines that there is a passenger on the cushion.

In another embodiment, the side supporting portion includes a filler and a cover layer surrounding the filler, the inflatable air cushion is position between the filler and the cover layer.

In another embodiment, the seat assembly further comprises a guiding member positioned between the filler and the cover layer and formed of rigid material, and the guiding member is configured obstruct the expansion of the inflatable air cushion toward the middle supporting portion such that the inflatable air cushion substantially expands away from the middle supporting portion.

In another embodiment, the guiding member includes a recess portion to receive the inflatable air cushion and first and second arms extending from two sides of the recess portion respectively and contacting with the filler.

In another embodiment, the cover layer is formed of flexible material.

In another embodiment, the inflator is positioned in the cushion.

In another embodiment, the side supporting portion having the inflatable air cushion is disposed adjacent to a console unit of the vehicle, the controller controls the inflator to inflate the inflatable air cushion at a predetermined volume such that the side supporting portion substantially contact the console unit of the vehicle.

According to yet another embodiment, a method of adjusting a vehicle seat assembly is provided. The vehicle includes a console unit, and the seat assembly includes a cushion, an inflatable air cushion positioned in the cushion along the side of the cushion adjacent to the console unit and an inflator connected to the inflatable air cushion. The method comprises determining if there is a passenger on the seat; and controlling the inflator to inflate the inflatable air cushion in response to a passenger occupancy signal such that the inflatable air cushion expands toward the console unit to reduce a gap between the side of the cushion and the console unit.

In one embodiment, a weight sensor is use to determine if there is a passenger on the cushion.

In another embodiment, the method further comprises determining if there is a passenger on the cushion based on information from a seatbelt sensor.

In another embodiment, the method further comprises inflating the inflatable air cushion after a predetermined time period when determined that there is a passenger on the cushion.

In another embodiment, the method further comprises inflating the inflatable air cushion at a predetermined volume such that the side of the cushion contacts the console unit of the vehicle.

In another embodiment, the method further comprises controlling the inflator to discharge the inflatable air cushion in response to a signal indicating no passenger occupancy on the seat.

In another embodiment, the method further comprises discharging the inflatable air cushion after a predetermined time period when determined that there is no passenger on the cushion.

One or more advantageous features as described herein are believed to be readily apparent from the following detailed description of one or more embodiments when taken in connection with the accompanying drawings.

DETAILED DESCRIPTION

Figure 1:
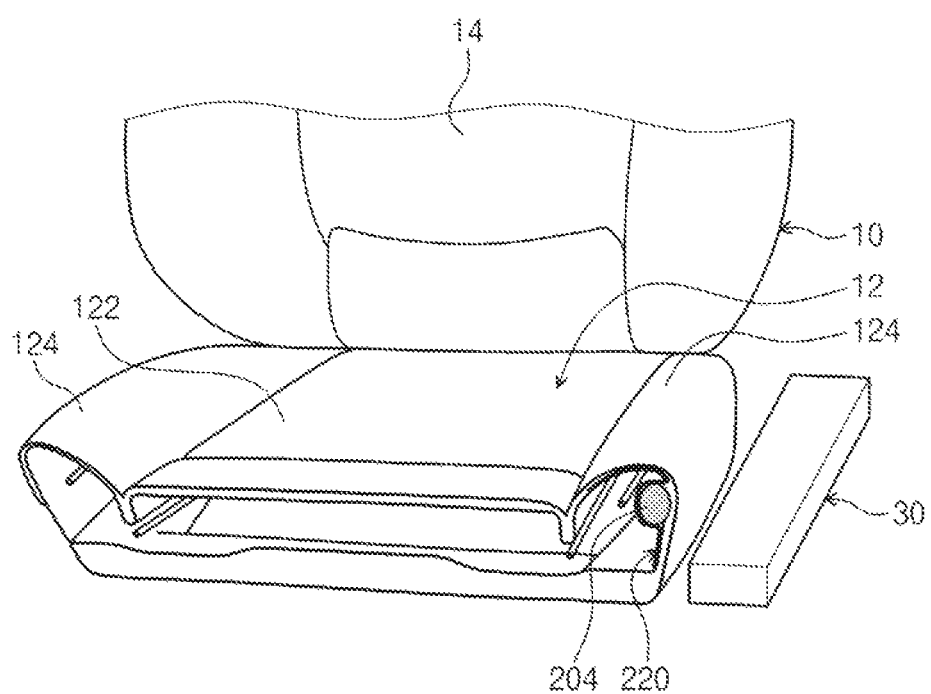
FIG. 1 depicts a seat assembly and a console unit positioned in a vehicle according to one or more embodiments of the present disclosure.

As referenced in the figures, the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

The present disclosure provides an inflatable air cushion system, a seat assembly and a method for controlling the same. The inflatable air cushion of the present disclosure is integrated into the seat assembly and can effectively prevent articles from dropping into a gap between a seat cushion and a console unit, and also maintain an integral and appealing appearance.

FIG. 1 depicts a view of a seat assembly 10 and a console unit 30 adjacent to the seat assembly 10 in a vehicle. The seat assembly 10 may be one of the front seats of the vehicle. In one or more embodiments, the seat assembly 10 includes a cushion 12 and a back 14. The cushion 12 includes a middle supporting portion 122 and two side supporting portions 124 positioned at two sides of the middle supporting portion 122, respectively. One of the side supporting portions 124 is adjacent to a console unit 30. The side supporting portion 124 adjacent to the console unit 30 includes an inflatable air cushion 204. In one or more embodiments, the side supporting portion 124 may include a guiding member 220.

Figure 2:
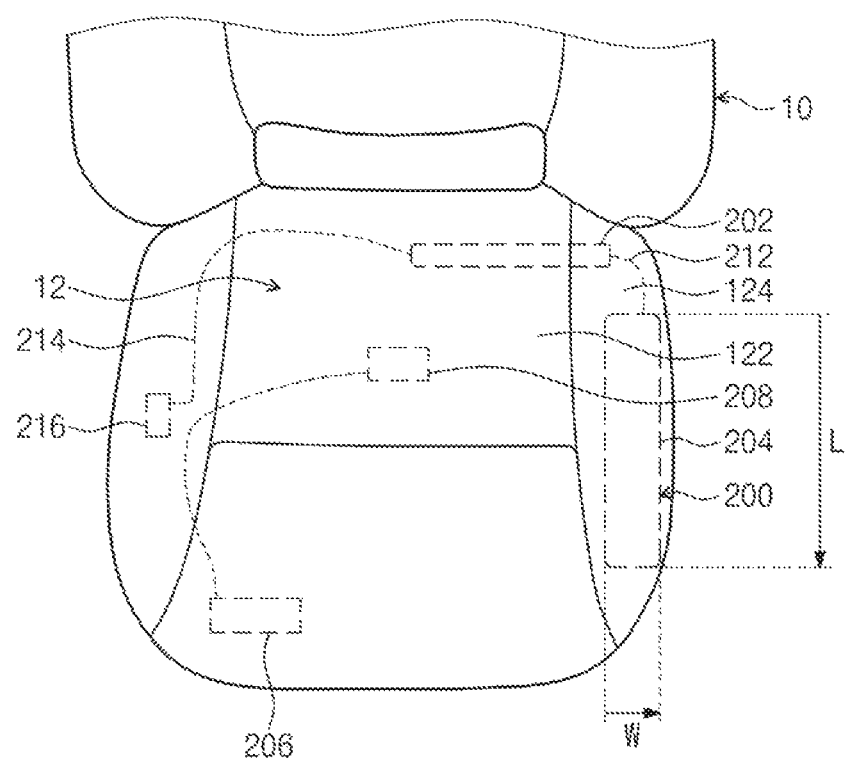
FIG. 2 depicts a perspective view of the seat assembly in FIG. 1.

FIG. 2 is a perspective view of the seat assembly 10 illustrating an embodiment of the inflatable air cushion system 200 in the seat assembly 10. In one or more embodiments, the inflatable air cushion system 200 includes an inflatable air cushion 204 with a length L and a width W, an inflator 202 and a controller 206. The inflatable air cushion 204 may be positioned in the side supporting portion 124 along its side. The inflator 202 may be connected with the inflatable air cushion 204 and the controller 206. In one or more embodiments, the inflator 202 may be positioned in the cushion 12. In another embodiment, the inflator 202 may be positioned at the bottom of the cushion 12. It should be appreciated that the inflator 202 may be positioned at any suitable location based on a configuration of a vehicle. The inflator 202 is connected to the inflatable air cushion 204 via a charging pipe 212. FIG. 2 also depicts that the inflator 202 may be connected to a power source 216 to receive power via a power cable 214.

In one or more embodiments, the controller 206 may be a single unit and positioned in the cushion 12. However, the controller 206 may be positioned at any suitable location based on a configuration of a vehicle. The controller 206 is configured to control the inflator 202 to inflate or charge the inflatable air cushion 204 when determined that there is a passenger on the cushion 12 such that the inflatable air cushion 204 expands. In one or more embodiments, the controller 204 controls the inflator 202 to charge the inflatable air cushion 204 such that the inflatable air cushion 204 expands. Although illustrated as one controller, the controller 206 may be part of the vehicle control system and may be controlled by various other controllers throughout the vehicle, such as a vehicle system controller (VSC). The one or more other controllers can collectively be referred to as a "controller" that commands various actuators in response to signals from various sensors to control operations, such as actuation of the inflator 202, engine start-stop, selection or schedule of transmission gear shifts etc. In other words, "controller" may be referred to as one or more controllers to control an independent system in the vehicle. Controller 206 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically programmable read-only memory), EEPROMs (electrically erasable programmable read-only memory), flash memory, or any other electric, magnetic, optical, or combination memory devices capable of storing data, some of which represent executable instructions, used by the controller in controlling the engine or vehicle.

Referring back to FIG. 2 and with reference to FIG. 1, in one or more embodiments, an inflatable air cushion system 200 for a vehicle seat is provided. The inflatable air cushion system 200 may include an inflatable air cushion 204 with a length of L and width W being configured to be mounted into the side supporting portion 124. The inflatable air cushion 204 is inflatable by charging or inflating gas such as air into the air cushion such that the seat side moves toward the console unit 30 to reduce the gap between the seat side and the console unit 30. In one or more embodiments, the inflatable air cushion 204 expands in one widthwise direction larger than an opposing widthwise direction when charged. In one or more embodiments, the inflatable air cushion 204 substantially expands substantially along only one direction along the widthwise direction when charged. As illustrated in the embodiment, the inflatable air cushion 204 expands in a direction away from the middle supporting portion 122 of the cushion 12, i.e. a direction toward the console unit 30.

Figure 3A:
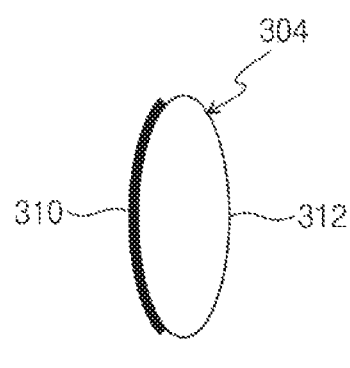
FIG. 3A and FIG. 3B depict a cross-sectional view of the inflatable air cushion according to one or more embodiments of the present disclosure.
Figure 3B:
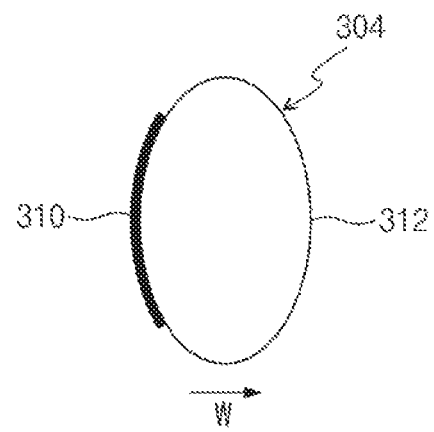

FIG. 3A and FIG. 3B depict a cross-sectional view of the inflatable air cushion according to one or more embodiments of the present disclosure. FIG. 3A depicts an unexpanded inflatable air cushion 304. In one or more embodiments, the inflatable air cushion includes a first portion 310 formed of non-inflatable material and a second portion 312 formed of inflatable material. As depicted in FIG. 3B, the second portion substantially expands in the widthwise direction when charged.

Now referring to FIG. 2, in one or more embodiments, the inflatable air cushion system 200 further includes a weight sensor 208 to detect if there is a passenger on the seat. The weight sensor 208 may be positioned in the middle supporting portion 122. The controller 206 controls the inflator 202 to charge the inflatable air cushion 204 in response to a passenger occupancy signal.

In one or more embodiments, the safety airbag system of the vehicle detects if there is a passenger on a seat. The controller 206 may be connected with the safety airbag system to receive a signal indicating if there is a passenger. Accordingly, the inflatable air cushion system 200 may not need a separate weight sensor.

In one or more embodiments, a seatbelt sensor may also be used to determine if there is a passenger on the cushion 12. For example, the controller 206 may be connected to a seatbelt sensor to acquire information to determine if there is a passenger on the cushion 12. For instance, when the seatbelt is buckled, the controller 206 may receive a passenger occupancy signal via the seatbelt sensor. In such embodiment, a weight sensor 208 may be omitted to reduce the system cost and complexity. In one or more other embodiments, the inflatable air cushion system 200 may include both the weight sensor 208 and the seatbelt sensor 210.

Now referring to FIG. 1 and FIG. 2, the inflatable air cushion system 200 further includes a guiding member 220 which may guide the inflatable air cushion 204 expanding in a defined widthwise direction. The guiding member 220 may be positioned along the length L of the inflatable air cushion 204, and at least partially accommodate the inflatable air cushion 204 in the widthwise direction of the inflatable air cushion 204. The guiding member 220 impedes an expansion of the inflatable air cushion 204 toward the guiding member 220 in the widthwise direction so that the inflatable air cushion expands substantially in the opposite direction. In one or more embodiments, the guiding member 220 may be formed of rigid materials, for instance including but not limited to: metal, alloy, high strength plastic compound. The guiding member 220 impedes the inflatable air cushion 204 expanding in a direction toward the middle supporting portion 122 such that the inflatable air cushion 204 substantially expands in a direction away from the middle supporting 122.

Figure 4:
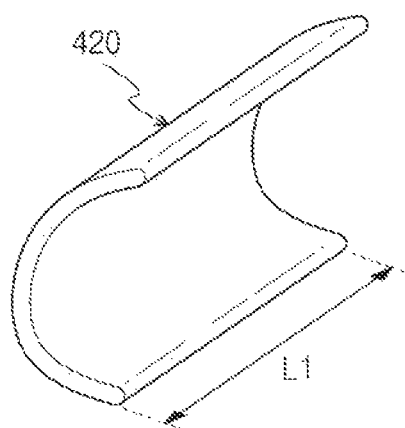
FIG. 4 depicts a perspective view of the guiding member according to one or more embodiments of the present disclosure.

FIG. 4 depicts a perspective view of the guiding member 420 according to one or more embodiments of the present disclosure. In one or more embodiments, the length L1 of the guiding member 420 may substantial be the same as or larger than that of the inflatable air cushion 204 and at least partially accommodate the inflatable air cushion 204 in the widthwise direction of the inflatable air cushion 204. The guiding member 420 may impede the expansion of the inflatable air cushion 204 toward the guiding member 420 in the widthwise direction. In the depicted embodiments, the cross-section of the guiding member 420 is a part of a circle which may accommodate the inflatable air cushion 204. The inflatable air cushion 204 may be bonded onto the guiding member 420. In some embodiment, the guiding member 420 may be a curved plate. In another embodiment, the inflatable air cushion 204 may only be placed on the guiding member 220 without being bonded to or connected to thereof by other means.

It is appreciated that the guiding member may have any suitable structure. For instance, the guiding member may be a flat plate. In another embodiment, the guiding member may also include portions adapting for seat portion as depicted in FIG. 5A and FIG. 5B.

Figure 5A:
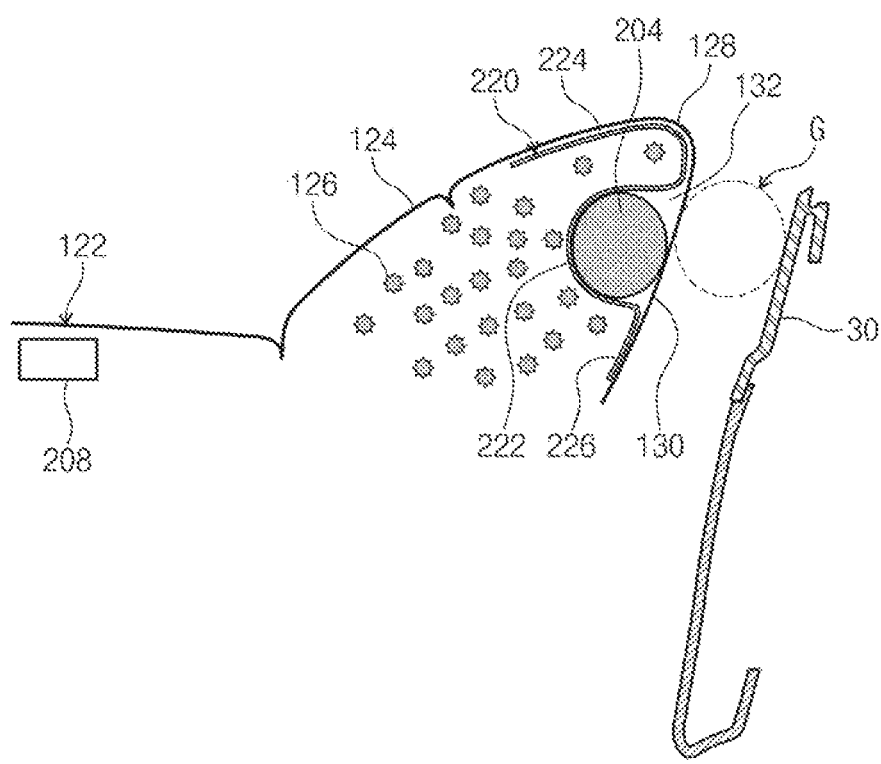
FIG. 5A depicts a partial cross-sectional view of the seat assembly and the console unit referenced in FIG. 1 before the inflatable air cushion is inflated.
Figure 5B:
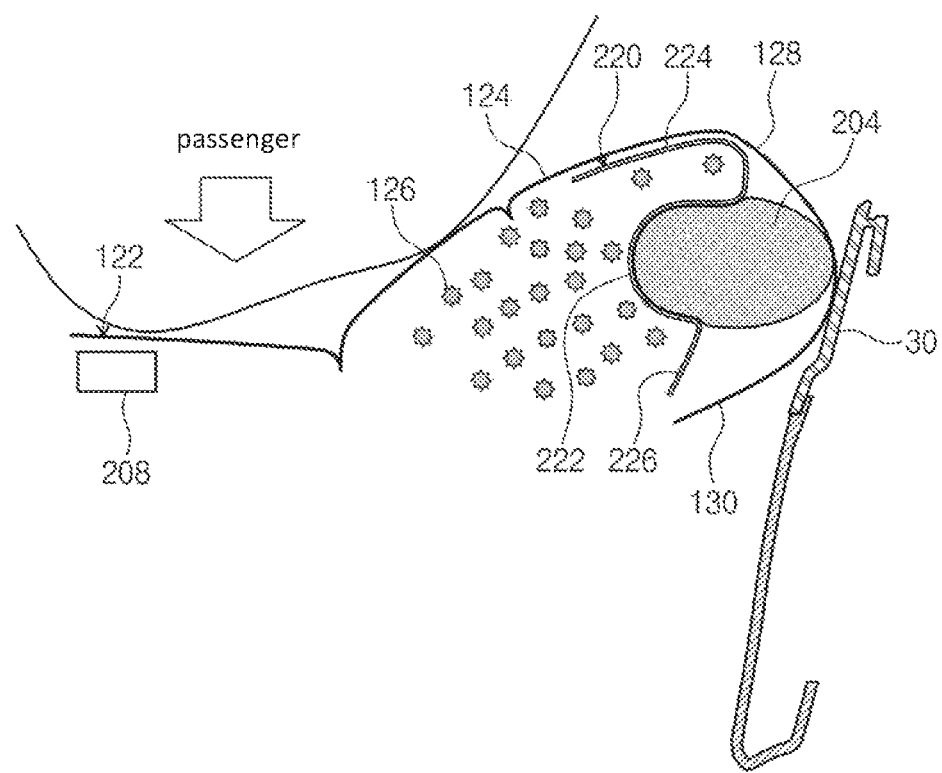
FIG. 5B depicts a partial cross-sectional view of the seat assembly and the console unit referenced in FIG. 1 after the inflatable air cushion is inflated.

Referring to FIG. 5A and FIG. 5B, FIG. 5A depicts a partial cross-sectional view of the inflatable air cushion 204, seat assembly 10 and console unit 30 referenced in FIG. 1, illustrating the seat assembly 10 before the inflatable air cushion 204 is inflated or charged. The side supporting portion 124 of the seat assembly 10 includes a filler 126 and a cover layer 128 surrounding the filler 126. The filler 126 may be formed of foam material or any suitable materials. A space 132 is defined between the filler 126 and side portion of the cover layer 128 to accommodate the inflatable air cushion 204. A portion of the cover layer 128 at least covering the inflatable air cushion 204 may be formed of flexible or elastic material. In one or more embodiments, the inflatable air cushion 204 may be positioned within the space 132.

In one or more embodiments, the seat assembly 10 may further include a guiding member 220 positioned between the filler 126 and the cover layer 128. The guiding member 220 may include a recess portion to accommodate the inflatable air cushion 204 and a first arm 224 and a second arm 226 respectively extending from two sides of the recess portion 222. The recess portion 222 may impede expansion of the inflatable air cushion 204 toward the middle supporting portion 122 in the widthwise direction of the inflatable air cushion 204 and in the up and down direction relative to the cushion surface. The first and second arms 224, 226 may effectively increase overall strength of the guiding member 220. In one or more embodiments, the first arm 224 and the second arm 226 extend in a direction different from the opening direction of the recess portion 222. Further, the opening of the recess portion 222 is directed toward a side portion 130 of the side supporting portion 124 or toward the console unit 30, and the first and second arms 224, 226 extend in a direction away from the recess portion 222 along the side portion 130, respectively and engage with the filler 126. In the depicted embodiment, the second arm 224 extends to a portion of the upper surface of the side supporting portion 124. The guiding member 220 may not need an additional supporting member because the guiding member 220 is positioned within the cover layer 128 and engages with the filler 126. For instance, when assembled, the guiding member 220 may be inserted into the filler 126, then the inflatable air cushion 204 may at least partially be assembled into the recess portion of the guiding member 126, and next the guiding member 220, the inflatable air cushion 204 along with the filler 126 may be covered by the cover layer 128.

FIG. 5A illustrates the weight sensor 208 being positioned in the middle supporting portion 122. FIG. 5A also illustrates a gap G between the side portion 130 and the console unit 30.

Referring to FIG. 5B, a partial cross-sectional view of the seat assembly 10 and console unit 30 referenced in FIG. 1 is depicted to show an inflated state of the inflatable air cushion 204. The inflatable air cushion 204 is guided to expand toward a direction away from the middle supporting portion 122 via the guiding member 220 after it is charged to push the side supporting portion 124 such that the side portion 130 approaches or substantially contacts the console unit 30 of the vehicle. Thus, the gap G between the side supporting portion 124 and the console unit 30 may be effectively reduced or eliminated.

Figure 6:
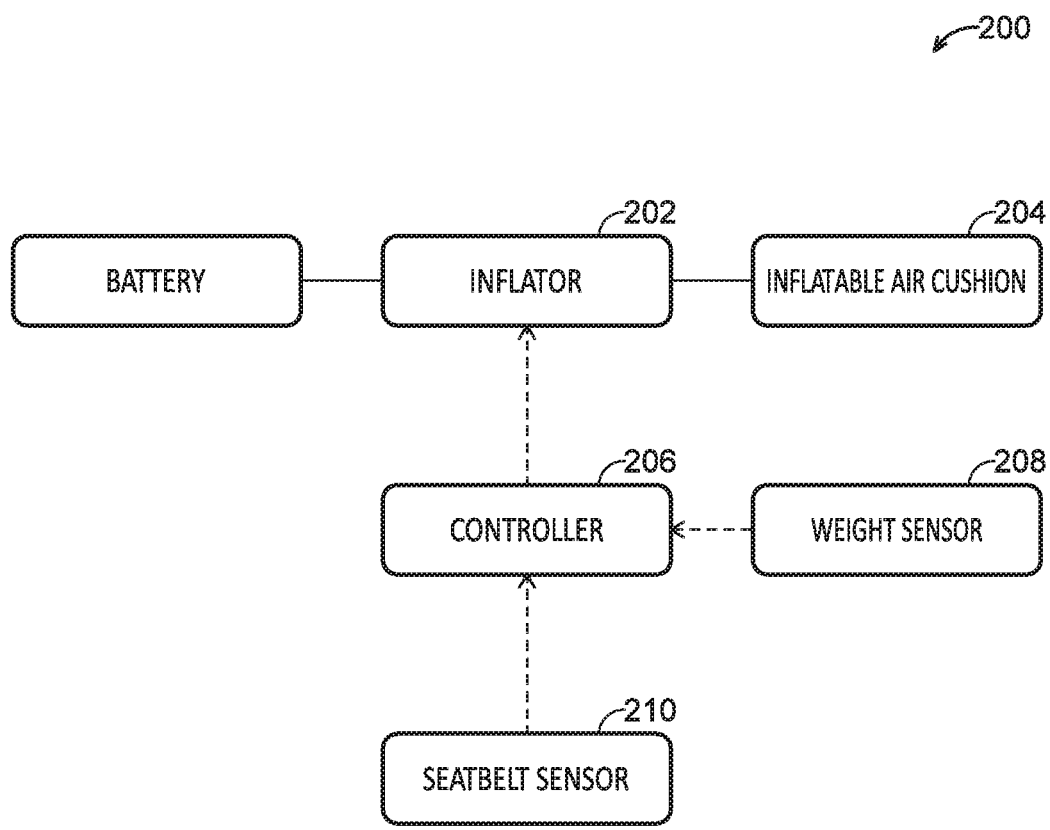
FIG. 6 depicts a functional block diagram for controlling the seat assembly referenced in FIG. 2 according to one or more embodiments of the present disclosure.

FIG. 6 depicts a functional block diagram illustrating the inflatable air cushion system 200 (further the seat assembly 10) according to one or more embodiments. The controller 206 receives input signals or parameter and output control signals. In one or more embodiments, the controller 206 may receive input signals from the weight sensor 208 to determine if there is a passenger on the seat. The weight sensor 208 may detect and/or measure the force or load applied on itself. The weight sensor 208 may be a weight sensor 208 configured for the inflatable air cushion system 200. Alternatively, the weight sensor may be a weight sensor of the vehicle safety airbag.

The controller 206 is configured to determine if there is a passenger on the seat from the received signal or parameter. For instance, when the weight sensor 208 detects pressure/load or pressure/load change, it may determine whether there is a passenger on the seat. For front row seats, when weight sensor 208 detects a predetermined pressure/load, it may determine there is a passenger on the seat. In one example, the predetermined pressure/load may be set as a person whose weight is greater than 30 kg. It should be appreciated that the predetermined pressure/load may be any suitable value.

In one or more embodiments, the controller 206 may receive a signal from the seatbelt sensor 210 to determine if there is a passenger on the seat.

FIG. 6 depicts the controller 206 being electrically connected to the inflator 202 to control the inflator 202. Referring to FIG. 2, the inflator 202 may be connected to a power source to receive electric energy via a power cable 214 and may be connected to the inflatable air cushion 204 via a charging pipe 212 to charge the inflatable air cushion 204 with gas such as air and inert gases. In one or more embodiments, the power source may be a separate auxiliary battery. Alternatively, and as needed, the power source may also be a vehicle system battery. When the controller 206 determines there is a passenger on the cushion 12, it controls the inflator 202 to charge the inflatable air cushion 204 at a predetermined volume such that the side portion 130 of the side supporting portion 124 substantially contacts the vehicle console unit 30.

Figure 7:
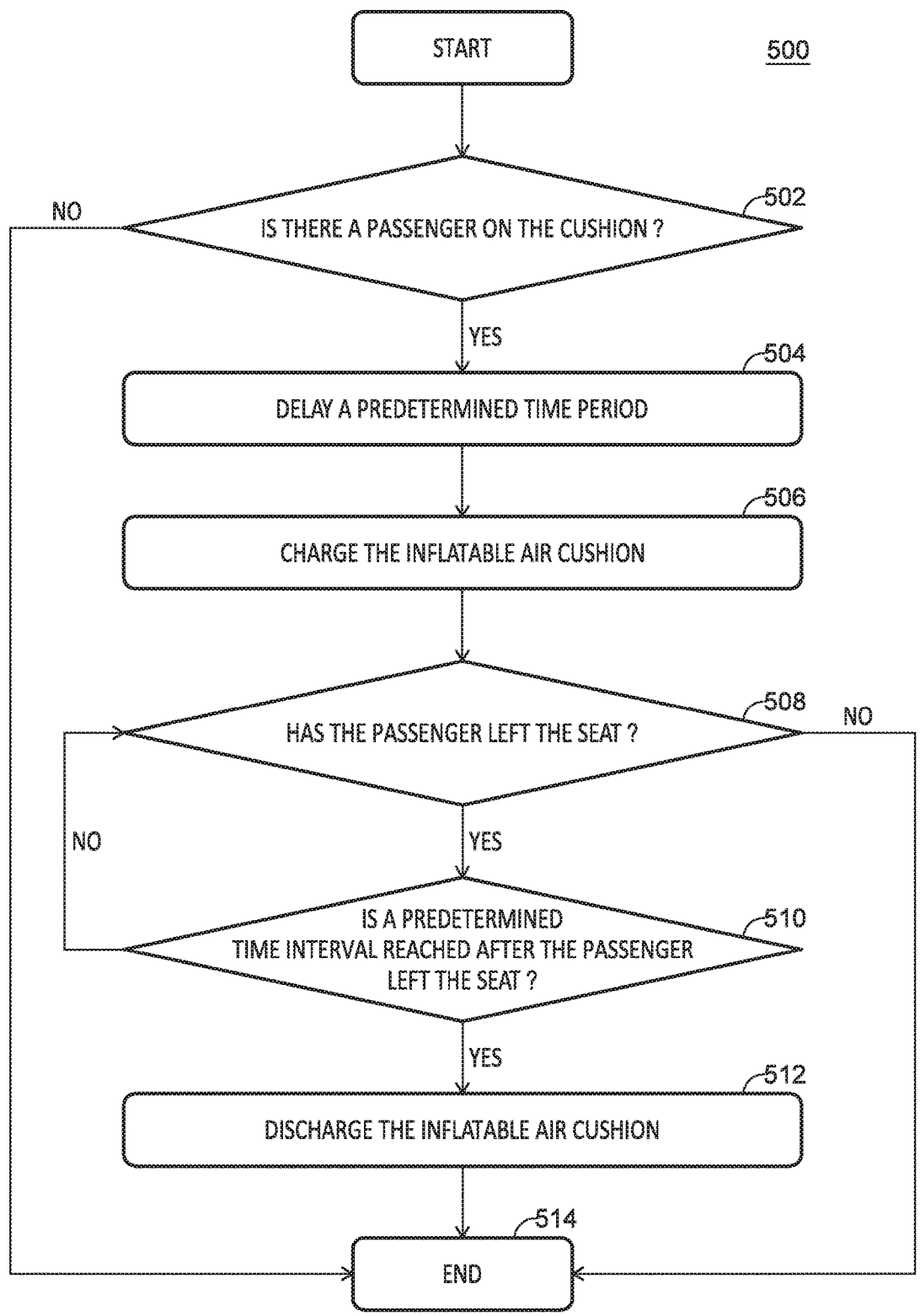
FIG. 7 is a flow chart illustrating a method of adjusting the seat assembly according to one or more embodiments of the present disclosure.

FIG. 7 is a flow chart illustrating a method of adjusting the seat assembly 10 according to one or more embodiments of the present disclosure. The method 500 starts at 502, where the method determines if there is a passenger on the cushion 12. It should be understood that the passenger refers to a driver or a passenger in the front seat. The controller 206 may determine if there is a passenger on the cushion 12 by the input signal received from the weight sensor 208 or seatbelt sensor 210. If the answer is no, the method proceeds to 514 and ends. If the answer is yes, the method 500 proceeds to 504.

The inflatable air cushion 204 is charged with gas by the inflator after a predetermined time period delay. Sometimes, the passenger may need time to adjust the seat. The inflatable air cushion 204 may be charged after the passenger has completed the adjustment of the seat such that an interference between the side supporting portion 124 and the console unit 30 may be avoided during the back and forth adjustments of the seat by remain the original gap exposed. In one or more embodiments, the predetermined time period may be 15 seconds, 30 seconds, etc. It should be appreciated that the step 504 may be omitted. The method may proceed to step 506 when it is determined there is a driver and/or passenger on the seat.

At 506, the method 500 may include charging or inflating the inflatable air cushion 204 to a predetermined volume. In one or more embodiments, the predetermined volume may be determined based on the distance between the side portion 130 of the side supporting portion 124 and the console unit 30. For instance, the controller 206 may control the inflator 202 to charge the inflatable air cushion 204, 304 to the predetermined volume such that the side portion 130 of the side supporting portion 124 substantially contacts the console unit 30 of the vehicle.

Next, the method 500 proceeds to 508 to determine if the passenger has left the seat. The controller 206 may determine if the passenger has left the cushion 12 by input signal received from the weight sensor 208 or seatbelt sensor 210. If the answer is no, the method 500 proceeds to 514 and ends. If the answer is yes, the method 500 proceeds to 510.

At 510, the method 500 determines if the passenger has left the seat up to predetermined time interval. In one or more embodiments, the predetermined time interval may be 30 seconds, 1 minute or 5 minutes. If the answer is no, the method 500 proceeds to 508. If the answer is yes, the method 500 proceeds to 512. The step 510 is advantageous in avoiding a recharge action when the passenger gets off the vehicle temporarily and returns after a short time, thus saving energy.

At 512, the method 500 includes discharging the gas in the inflatable air cushion 204.

Next, the method 500 proceeds to 514 and ends.

Figure 8:
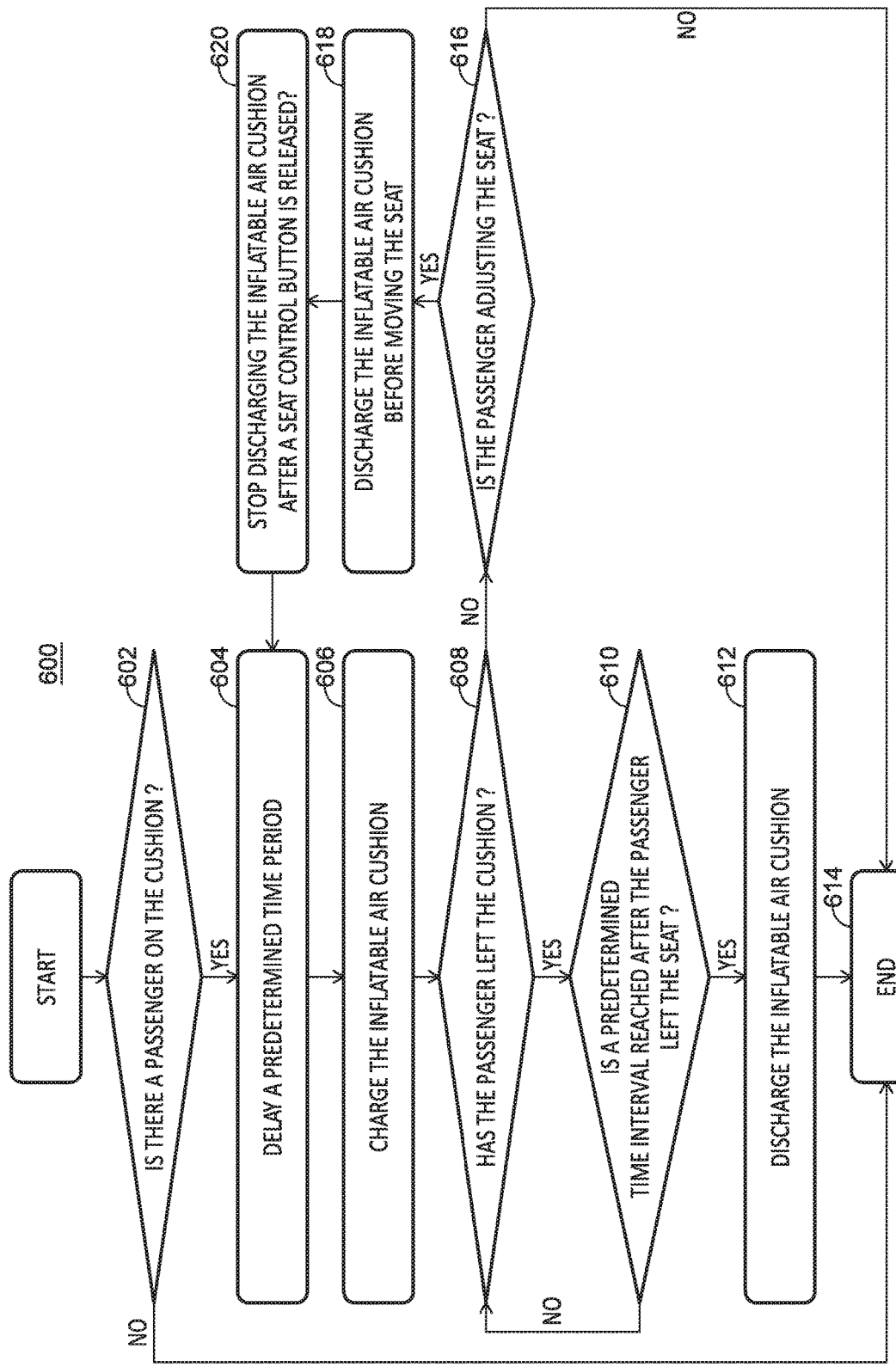
FIG. 8 is a flow chart illustrating a method of adjusting the seat assembly according to one or more embodiments of the present disclosure.

FIG. 8 is a flow chart illustrating a method of adjusting the seat assembly 10 according to another embodiment of the present disclosure. The method 600 is particularly beneficial to a vehicle incorporating an electric powered seat.

The method 600 starts at 602, because steps 602 though steps 614 are the same as steps 502 though steps 514 referenced in FIG. 5. For the purposes of brevity, the detailed description on the similar or same step is omitted.

At 608, the method 600 determines if the passenger has left the seat. If the answer is no, the method proceeds to 616.

In some embodiment, the seat is electronically powered and adjusted by a seat control button. At 616, the method 600 determines if the passenger is adjusting the seat. The seat adjustment may be determined by receiving a signal indicating the activation of the seat control button by a passenger. If the answer is no, the method 600 proceeds to 614 and ends. If the answer is yes, the method 600 proceeds to 618.

At 618, the method 600 includes controlling the inflator 202 to discharge the inflatable air cushion 204. In one or more embodiments, the controller 206 may control the inflator 202 to discharge a predetermined volume of the gas out of the inflatable air cushion 204. The discharged volume at 618 may be less than the discharged volume at 606 as long as the side portion 130 of the side supporting portion 124 is separated from the console unit 30. In this way, a smaller volume of gas needs to be filled next time to re-inflate, thus saving energy. As a small volume of gas may be discharged, it takes less time the time to create enough gap and will not cause inconvenience to the passenger.

Next at 620, the method may include stopping discharge the inflatable air cushion after the seat control button is release, which may be determined from a signal received from a seat controller. Next, the method 600 proceeds to 604 from 620.

The inflatable air cushion integrated into the seat assembly not only prevents small articles from dropping into the gap between the seat and the console unit, but also maintains overall appearance integrity of the seat assembly.

In one or more embodiments, the present invention as set forth herein is believed to have overcome certain challenges associated with the seat assembly. However, one skilled in the art will readily recognize from such discussion, and from the accompanying drawings and claims that various changes, modifications and variations can be made therein without departing from the true spirit and fair scope of the invention as defined by the following claims.

The invention claimed is:

1. An inflatable air cushion system of a vehicle seat, comprising:
    an inflatable air cushion positioned within a side supporting portion of the seat with a length and a width configured to be fitted into the side supporting portion of the seat, wherein the inflatable air cushion includes a first portion formed of non-inflatable material and a second portion formed of inflatable material, and wherein the first portion is positioned adjacent to the middle supporting portion of the cushion and the second portion substantially expands in a widthwise direction away from the middle portion when charged;
    an inflator connecting to the inflatable air cushion; and
    a controller to control the inflator to inflate the inflatable air cushion in response to a passenger occupancy signal.

2. The inflatable air cushion system of claim 1, further comprising a weight sensor to detect if there is a passenger on the seat.

3. A seat assembly of a vehicle, comprising:
    a cushion including a middle supporting portion and two side supporting portions respectively positioned at opposing sides of the middle supporting portion;
    an inflatable air cushion positioned in at least one of the side supporting portions along a side of the side supporting portion;
    a guiding member in the side supporting portion and formed of rigid material;
    an inflator connecting to the inflatable air cushion; and
    a controller configured to control the inflator to inflate the inflatable air cushion when it is determined that there is a passenger on the cushion such that the inflatable air cushion expands substantially in a widthwise direction away from the middle supporting portion of the cushion,
    wherein the side supporting portion of the cushion includes a cover layer surrounding the inflatable air cushion and the guide member, and the inflatable air cushion is positioned between the guide member and a side portion of the cover layer, and
    wherein the guiding member obstructs expansion of the inflatable air cushion toward the middle supporting portion such that the inflatable air cushion substantially expands away from the middle supporting portion.

4. The seat assembly of the claim 3, further comprising a weight sensor positioned in the middle supporting portion so as to determine if there is a passenger on the cushion.

5. The seat assembly of the claim 3, wherein the controller is connected with a seatbelt sensor to obtain information for determining if there is a passenger on the cushion.

6. The seat assembly of the claim 3, wherein the inflatable air cushion is inflated after a predetermined time period when the controller determines there is a passenger on the cushion.

7. The seat assembly of the claim 3, wherein the side supporting portion includes a filler, the cover layer surrounds the filler, and the guide member is positioned adjacent the filler.

8. The seat assembly of the claim 7, wherein the guiding member includes a recess portion to receive the inflatable air cushion and first and second arms extending from two sides of the recess portion respectively and contacting with the filler.

9. The seat assembly of the claim 3, wherein the cover layer is formed of flexible material.

10. The seat assembly of the claim 3, wherein the inflator is positioned in the cushion.

11. The seat assembly of the claim 3, wherein the side supporting portion containing the inflatable air cushion is proximate to a console unit of the vehicle, the controller is configured to control the inflator to inflate the inflatable air cushion at a predetermined volume such that the side supporting portion substantially contacts the console unit of the vehicle.

12. A method of adjusting a vehicle seat assembly, the vehicle including a console unit, the seat assembly including a cushion, an inflatable air cushion positioned in the cushion along a side of the cushion adjacent to the console unit, a guiding member in the cushion, and an inflator connected to the inflatable air cushion, the method comprising:
    determining if there is a passenger on the seat; and
    controlling the inflator to inflate the inflatable air cushion in response to a passenger occupancy signal such that the inflatable air cushion expands away from the guide member toward the console unit to reduce a gap between the side of the cushion and the console unit,
    wherein the guide member is formed of rigid material and the air inflatable air cushion is positioned between the guide member and the side of the cushion adjacent to the console unit.

13. The method of the claim 12, wherein a weight sensor is used to determine if there is a passenger on the cushion.

14. The method of the claim 12, further comprising determining if there is a passenger on the cushion based on information from a seatbelt sensor.

15. The method of the claim 12, further comprising inflating the inflatable air cushion after a predetermined time period when it is determined that there is a passenger on the cushion.

16. The method of the claim 12, further comprising inflating the inflatable air cushion at a predetermined volume such that the side of the cushion contacts the console unit of the vehicle.

17. The method of the claim 12, further comprising controlling the inflator to discharge the inflatable air cushion in response to a non-passenger occupancy signal.

18. The method of the claim 17, further comprising discharging the inflatable air cushion after a predetermined time period when it is determined that there is no passenger on the cushion.

* * * * *